(12) United States Patent
Mayr et al.

(10) Patent No.: US 10,184,468 B2
(45) Date of Patent: Jan. 22, 2019

(54) PUMP HOUSING OF A MOTOR VEHICLE HYDRAULIC UNIT WITH AT LEAST ONE MAIN CYLINDER CONNECTION OPENING

(75) Inventors: Matthias Mayr, Rettenberg (DE); Alexander Bareiss, Immenstadt (DE); Andreas Weh, Sulzberg (DE)

(73) Assignee: Robert Bosch GmbH, Stuttgart (DE)

( * ) Notice: Subject to any disclaimer, the term of this patent is extended or adjusted under 35 U.S.C. 154(b) by 1729 days.

(21) Appl. No.: 13/384,328

(22) PCT Filed: May 26, 2010

(86) PCT No.: PCT/EP2010/057208
§ 371 (c)(1),
(2), (4) Date: Mar. 23, 2012

(87) PCT Pub. No.: WO2011/009662
PCT Pub. Date: Jan. 27, 2011

(65) Prior Publication Data
US 2012/0177516 A1 Jul. 12, 2012

(30) Foreign Application Priority Data

Jul. 20, 2009 (DE) .................. 10 2009 027 827

(51) Int. Cl.
*F04B 53/16* (2006.01)
*F04B 53/22* (2006.01)
(Continued)

(52) U.S. Cl.
CPC .............. *F04B 53/16* (2013.01); *B60T 8/368* (2013.01); *B60T 8/4031* (2013.01);
(Continued)

(58) Field of Classification Search
CPC ...... F04B 39/12; F04B 39/121; F04B 39/122; F04B 39/127; F04B 39/14; F04B 53/16;
(Continued)

(56) References Cited

U.S. PATENT DOCUMENTS 4,725,104 A * 2/1988 Yardley ..................... 303/115.6
5,460,438 A * 10/1995 Hellmann et al. ......... 303/119.3
(Continued)

FOREIGN PATENT DOCUMENTS

DE         102 36 389 A1    2/2004
DE    10 2007 031 308 A1    1/2009
(Continued)

OTHER PUBLICATIONS

International Search Report corresponding to PCT Application No. PCT/EP2010/057208, dated Aug. 27, 2010 (German and English language document) (4 pages).

*Primary Examiner* — Essama Omgba
*Assistant Examiner* — Timothy P Solak
(74) *Attorney, Agent, or Firm* — Maginot, Moore & Beck LLP

(57) ABSTRACT

A pump housing of a motor vehicle hydraulic unit is disclosed. The pump housing has at least one side surface, at least one main cylinder connection opening, at least one pump element opening and a connecting line which connects the at least one main cylinder connection opening to the at least one pump element opening. The pump housing is designed as a blind bore into the pump housing, and the blind bore of the connecting line extends from the at least one side surface initially through the at least one pump element opening and subsequently into the at least one main cylinder connection opening.

11 Claims, 3 Drawing Sheets

(51) Int. Cl.
*F04B 39/12* (2006.01)
*F04B 1/053* (2006.01)
*F04B 39/14* (2006.01)
*B60T 8/36* (2006.01)
*B60T 8/40* (2006.01)

(52) U.S. Cl.
CPC .......... *F04B 1/0538* (2013.01); *F04B 39/121* (2013.01); *F04B 39/122* (2013.01); *F04B 39/127* (2013.01); *F04B 39/14* (2013.01); *F04B 53/22* (2013.01); *Y10T 29/49229* (2015.01)

(58) Field of Classification Search
CPC ...... F04B 53/162; F04B 53/22; F04B 1/0538; B60T 8/368; B60T 8/4031; B60T 8/4072
USPC ............ 417/53, 398, 399, 415, 454; 29/888, 29/888.02
See application file for complete search history.

(56) References Cited

U.S. PATENT DOCUMENTS

| | | | |
|---|---|---|---|
| 5,791,841 A * | 8/1998 | Zones | 409/132 |
| 6,588,405 B1 * | 7/2003 | Streicher et al. | 123/495 |
| 6,725,844 B2 * | 4/2004 | Banzhat et al. | 123/495 |
| 2004/0046446 A1 * | 3/2004 | Dinkel et al. | 303/119.3 |
| 2006/0099090 A1 * | 5/2006 | Kramp et al. | 417/415 |
| 2007/0176484 A1 | 8/2007 | Reuter et al. | |

FOREIGN PATENT DOCUMENTS

| | | | | |
|---|---|---|---|---|
| EP | 0 759 388 | * | 2/1997 | ............... B60T 8/36 |
| EP | 0 759 388 A2 | | 2/1997 | |
| JP | 4-506787 A | | 11/1992 | |
| JP | 9-30388 A | | 2/1997 | |
| JP | 11-11286 A | | 1/1999 | |
| JP | 2001-523611 A | | 11/2001 | |
| JP | 2004-75052 A | | 3/2004 | |

* cited by examiner

PUMP HOUSING OF A MOTOR VEHICLE HYDRAULIC UNIT WITH AT LEAST ONE MAIN CYLINDER CONNECTION OPENING

This application is a 35 U.S.C. § 371 National Stage Application of PCT/EP2010/057208, filed on May 26, 2010, which claims the benefit of priority to Serial No. DE 10 2009 027 827.3, filed on Jul. 20, 2009 in Germany, the disclosures of which are incorporated herein by reference in their entirety.

The disclosure relates to a pump housing of a motor vehicle hydraulic unit, which has at least one side face, at least one main cylinder connection opening, at least one pump element opening and a connecting line, which connects the at least one main cylinder connection opening to the at least one pump element opening and is designed as a pocket bore leading into the pump housing. The disclosure furthermore relates to a method for producing a pump housing of a motor vehicle hydraulic unit, comprising the following steps: formation of at least one side face, at least one main cylinder connection opening, at least one pump element opening and a connecting line, which connects the at least one main cylinder connection opening to the at least one pump element opening.

BACKGROUND

Hydraulic units are used in motor vehicles, e.g. motor cars or trucks, in order to provide controlled brake pressures to the brake system thereof. In particular, hydraulic units of this kind are used to implement functions of an antilock brake system (ABS), anti-slip regulation system (ASR) and/or electronic stability program (ESP). Brake pressure is produced in the brake system at a main cylinder, in particular by way of a brake pedal by a driver of the motor vehicle. For metering this brake pressure, the hydraulic units have a pump with a plurality of pump plungers or pump elements, a motor and a multiplicity of valves. In general, the valves are electromagnetically controlled, allowing different brake pressures to be provided at individual brakes or brake circuits. At least one main cylinder connection opening is formed on the hydraulic unit for hydraulic connection of the hydraulic unit to the main cylinder.

It is an object of the disclosure to provide a pump housing of a motor vehicle hydraulic unit which is of more compact configuration and, if possible, also lighter than known pump housings.

SUMMARY

The object is achieved by a pump housing as set forth below and by a method for producing a pump housing as also set forth below. Advantageous developments of the features of the disclosure are described below as well.

The disclosure provides a pump housing of a motor vehicle hydraulic unit which has at least one side face, at least one main cylinder connection opening, at least one pump element opening and a connecting line, which connects the at least one main cylinder connection opening to the at least one pump element opening and is designed as a pocket bore leading into the pump housing, and in which, starting from the at least one side face, the pocket bore of the connecting line extends initially through the at least one pump element opening and subsequently into the at least one main cylinder connection opening.

In the known pump housings, as already mentioned at the outset, numerous openings for valves and pump elements and the required connections, in particular for connection to the main cylinder, have to be provided. Some of these openings have to be connected hydraulically by connecting lines within the pump housing, while others have to be strictly separated. This gives rise to a necessary internal line structure in the pump housing whose economical realization while allowing for the high requirements, especially as regards low weight, a small amount of space and, at the same time, extremely high operational reliability, represents a difficult problem. As a part of known solutions to the problem, it is the customary practice in known pump housings for the connecting lines between the main cylinder openings and the associated pump element openings to be routed from a side face adjacent to the main cylinder openings, through the main cylinder openings, to the pump element openings. The reason for this is, in particular, that the pump element openings are situated in the central area of the pump housing and this known solution results in particularly short boring distances for the connecting lines. Short boring distances entail not only low production costs but obviously also require only a small amount of space.

The solution according to the disclosure takes an entirely different route and provides connecting lines between the main cylinder connection openings and the pump element openings from a side face remote from the main cylinder connection openings or opposite the pump element openings. In this case, the individual connecting line starts from this side face and extends initially into the central area of the pump housing, passes through the associated pump element opening and is then taken on further as far as the associated main cylinder connection opening, where it ends as a pocket bore.

Admittedly, the connecting line of this kind according to the disclosure thus requires more space within the pump housing but this is only a disadvantage at first glance. Upon closer examination, it is namely found that such a configuration allows improved and space-saving routing of the lines within the pump housing overall and, as a result, it may even be possible to reduce the size of the pump housing in terms of its external dimensions. With the longer connecting line, more material is removed from within the pump housing, thereby even reducing the overall weight of the pump housing. This is another advantage of the solution according to the disclosure.

Moreover, the disclosure has the advantage that an "overhang", which is required on known pump housings, can be eliminated. This overhang is a raised portion on one of the faces of the otherwise cuboidal pump housing, in which, in particular, two main cylinder connection openings are formed. These main cylinder connection openings must be arranged as far as possible away from an opening, formed centrally in the pump housing, for a drive eccentric and a motor pole housing in order to create enough space for assembly. At the same time, the main cylinder connection openings must be at a sufficient distance from the other connection openings, in particular the wheel cylinder connection openings and also the other line bores. Some of the line bores are provided with staked ball features, for which purpose a particularly large amount of material must be provided between the openings in order to avoid unwanted deformation of the material. In the case of known pump housings, this material which has to be provided has the effect that the main cylinder connection openings can no longer be arranged in the usual plane or surface of the cuboidal pump housing but "project" therefrom. As a result, the overhang mentioned is required as a second plane with an associated step. However, this entails additional costs in production and, in addition, difficulties in alignment for assembly. During assembly, the pump housing must be held in both planes, and these have dimensional tolerances relative to one another.

In the solution according to the disclosure, one staked ball feature is omitted next to each of the main cylinder connection openings since, as explained above, the associated line bore is routed into the pump housing from the opposite side. This eliminates the area of material that has to be provided for the staked ball feature. The main cylinder connection openings can therefore be arranged in the already existing plane or surface of the cuboidal pump housing, on which the associated motor is also mounted, and do not have to "project" therefrom.

In a first advantageous development of the pump housing according to the disclosure, the pocket bore is configured as a stepped bore, and a staked ball feature, which closes the connecting line in a fluid tight manner, is formed at the step of the stepped bore.

Said stepped bore and staked ball feature provide the basis for a small hydraulically used internal volume of the connecting line. The small internal volume is advantageous in respect of dead areas and a hydraulic damping effect, which should be avoided if at all possible.

In a second advantageous development of the pump housing according to the disclosure, at least one accumulator opening is formed at the at least one side face, and the staked ball feature is formed between the accumulator opening and the pump element opening in the longitudinal direction of the connecting line.

The staked ball feature, which is thus formed on a bottom area of the accumulator bore or, in addition, in the solid material of the pump housing, avoids an otherwise possible deformation of the pump housing and thus increases operational reliability.

In a third advantageous development of the pump housing according to the disclosure, the pump element opening is of circular cylindrical configuration, the connecting line is formed tangentially through the pump element opening, and the intersection between the connecting line and the pump element opening is configured with an undercut in the pump element opening.

The undercut is a low-cost way of creating the possibility of flow around the associated pump element, a possibility required for the operation of the motor vehicle hydraulic unit.

According to the disclosure, the object is furthermore achieved by a method for producing a pump housing of a motor vehicle hydraulic unit, comprising the following steps: formation of at least one side face, at least one main cylinder connection opening, at least one pump element opening and a connecting line, which connects the at least one main cylinder connection opening to the at least one pump element opening, wherein, starting from the at least one side face, the connecting line is bored through the at least one pump element opening and into the at least one main cylinder connection opening.

In a first advantageous development of the method according to the disclosure, which matches the embodiment described above, the connecting line is configured as a stepped bore, and a staked ball feature, which closes the connecting line in a fluid tight manner, is formed at the step of the stepped bore.

In a second advantageous development of the method according to the disclosure, at least one accumulator opening is correspondingly formed at the at least one side face, and the staked ball feature is formed between the accumulator opening and the pump element opening in the longitudinal direction of the connecting line.

In a third advantageous development of the method according to the disclosure, the pump element opening is, in a corresponding way, configured as a circular cylinder, the connecting line is formed tangentially through the pump element opening, and the intersection between the connecting line and the pump element opening is configured with an undercut in the pump element opening.

BRIEF DESCRIPTION OF THE DRAWINGS

An illustrative embodiment of the solution according to the disclosure is explained in greater detail below with reference to the attached schematic drawings, in which.

DETAILED DESCRIPTION

Figure 1:
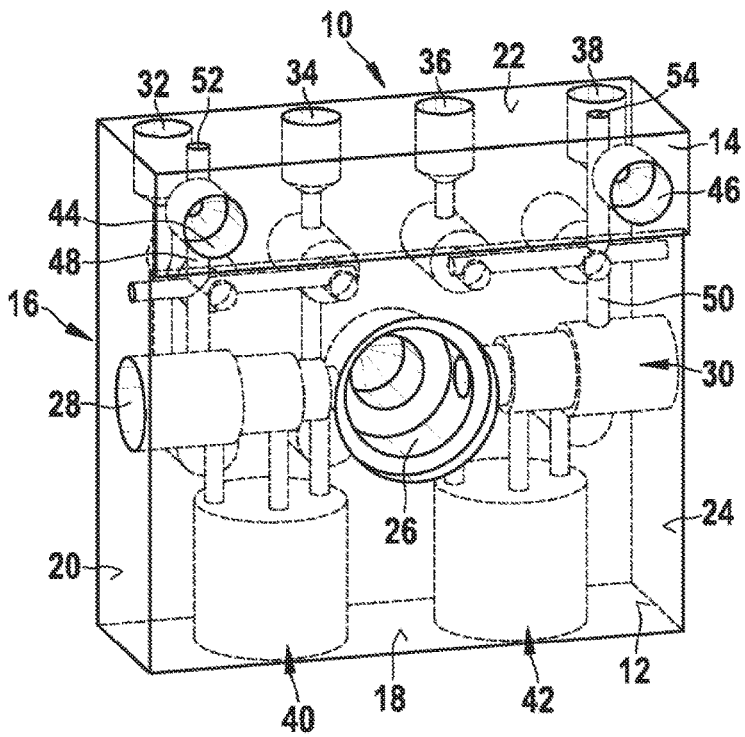
FIG. 1 shows a perspective front view of a pump housing of a motor vehicle hydraulic unit in accordance with the prior art.
Figure 3:
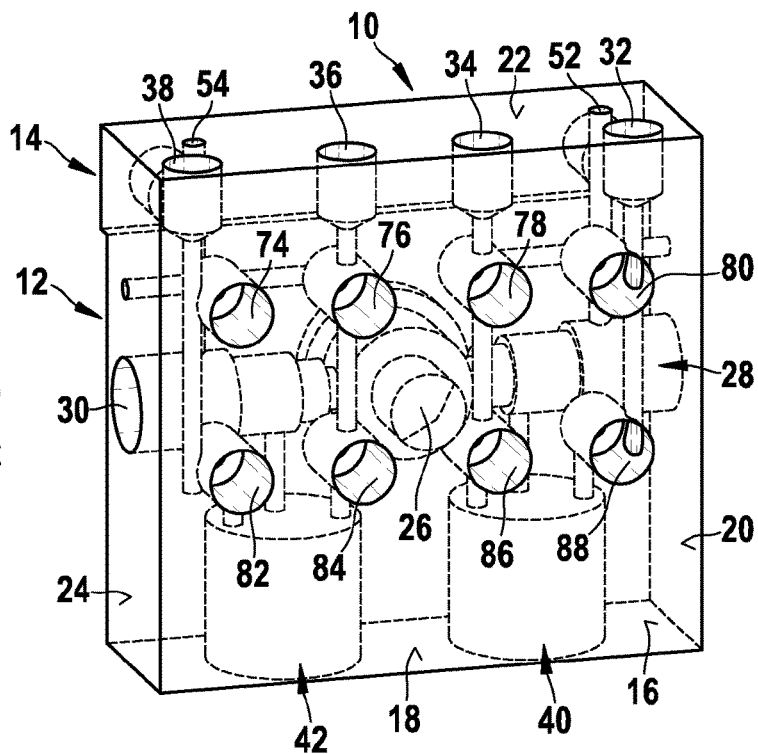
FIG. 3 shows a perspective rear view of the pump housing shown in FIG. 1.

FIGS. 1 and 3 show a substantially cuboidal pump housing 10 in accordance with the prior art, which has a front face 12 with an overhang 14 formed thereon, a rear face 16 and four side faces 18, 20, 22 and 24.

An eccentric opening 26 for accommodating the eccentric (not shown) of an associated drive motor is formed centrally in the front face 12. Respective stepped pump element openings 28 and 30 are formed centrally in side faces 20 and 24, each extending as far as the eccentric opening 26 and serving to accommodate a pump element or pump plunger (not shown in FIGS. 1 to 4). Four wheel cylinder connection openings 32, 34, 36 and 38 for accommodating wheel cylinder connections (not shown) are formed in side face 22, from which connections lines (illustrated only for the sake of completeness) extend into the interior of the pump housing 10. Two accumulator openings 40 and 42, from which lines (illustrated only for the sake of completeness) likewise extend into the interior of the pump housing 10, are formed in side face 18.

Two main cylinder connection openings 44 and 46 are formed on the overhang 14 of side face 12. These openings are connected in a fluid-carrying manner to respectively associated pump element openings 28 and 30 by respectively associated connecting lines 48 and 50. The connecting lines 48 and 50 are bored into the pump housing 10, starting from side face 22, i.e. the side face adjacent to the main cylinder connection openings 44 and 46. Starting from side face 22, the connecting lines 48 and 50 initially reach the main cylinder connection openings 44 and 46 and then the pump element openings 28 and 30. Two staked ball features 52 and 54, by means of which the connecting lines 48 and 50 are sealed off from the environment of the pump housing 10, are formed at side face 22 at the points where the connecting lines 48 and 50 are bored into side face 22.

Figure 2:
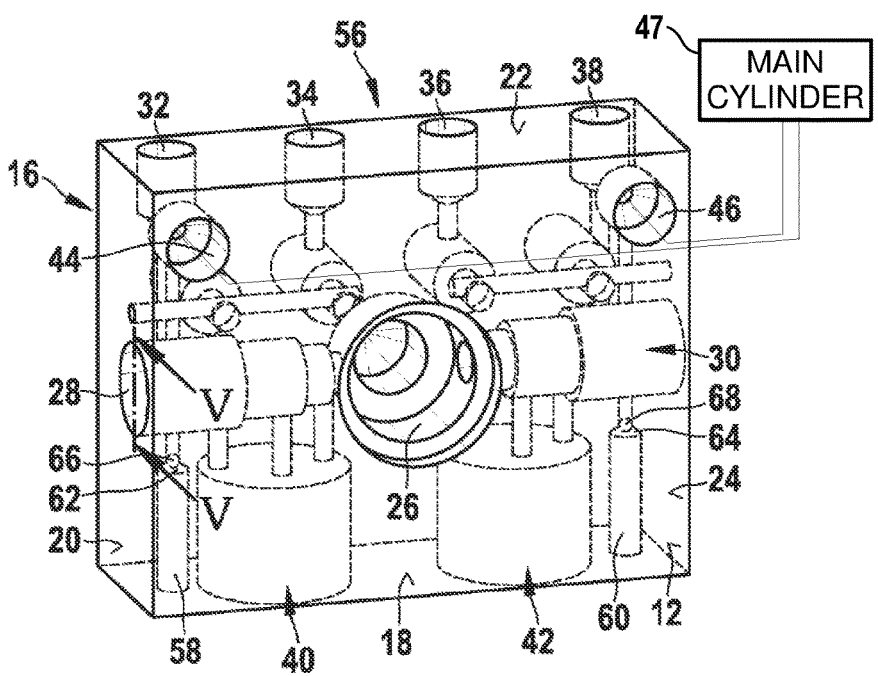
FIG. 2 shows a perspective front view of a pump housing of a motor vehicle hydraulic unit in accordance with the invention disclosure.
Figure 4:
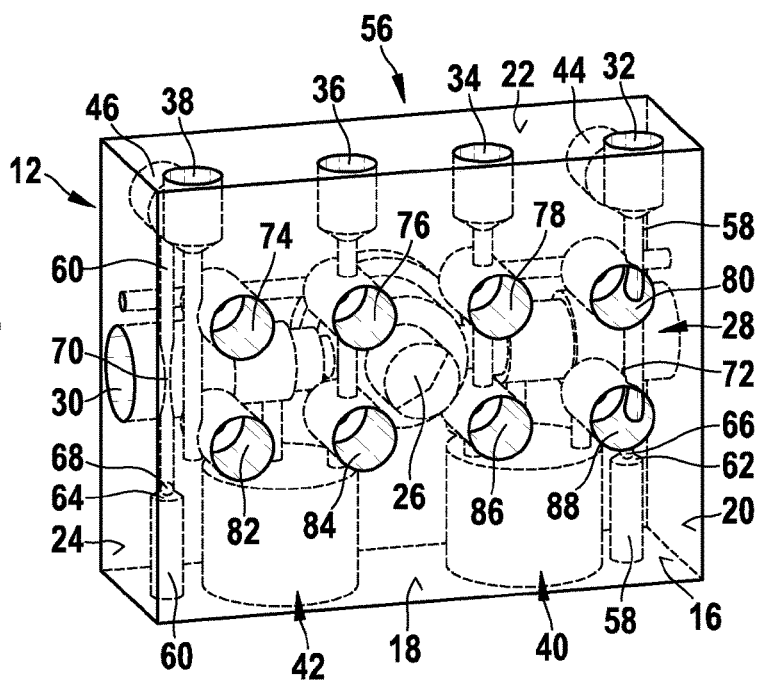
FIG. 4 shows a perspective rear view of the pump housing shown in FIG. 2.

FIGS. 2 and 4 show a pump housing 56 according to the disclosure, which is likewise of cuboidal configuration, with a front face 12, a rear face 16, side faces 18, 20, 22 and 24, a central eccentric opening 26 in the front face 12, two lateral pump element openings 28 and 30 in side faces 20 and 24 respectively, four wheel cylinder connection openings 32, 34, 36 and 38 in side face 22, two accumulator openings 40 and 42 in side face 18 and two main cylinder connection openings 44 and 46 configured to connect to a main cylinder 47 in the front face 12 above the eccentric opening 26.

Respective connecting lines 58 and 60 are formed as fluid-carrying connections between each of the main cylinder connection openings 44 and 46 and the associated pump element openings 28 and 30, said connecting lines being bored into the pump housing 56 from below in FIGS. 2 and 4. The connecting lines 58 and 60 thus extend into the pump housing 56, starting from side face 18, initially reach the pump element openings 28 and 30, and then extend onward as far as the main cylinder connection openings 44 and 46, where they end as pocket holes. This makes possible a particularly compact and space-saving configuration of the hydraulic elements within the pump housing 56. Moreover, the pump housing 56 is lighter than conventional pump housings.

The connecting lines 58 and 60 are each configured as stepped bores, the steps 62 and 64 of which are situated between the accumulator openings 40 and 42 and the pump element openings 28 and 30, when viewed in the longitudinal direction of the connecting lines 58 and 60. Respective staked ball features 66 and 68, by means of which the connecting lines 58 and 60 are sealed off from the environment of the pump housing 56 or from the outside, are formed at the steps 62 and 64 in the interior of the pump housing 56.

Figure 5:
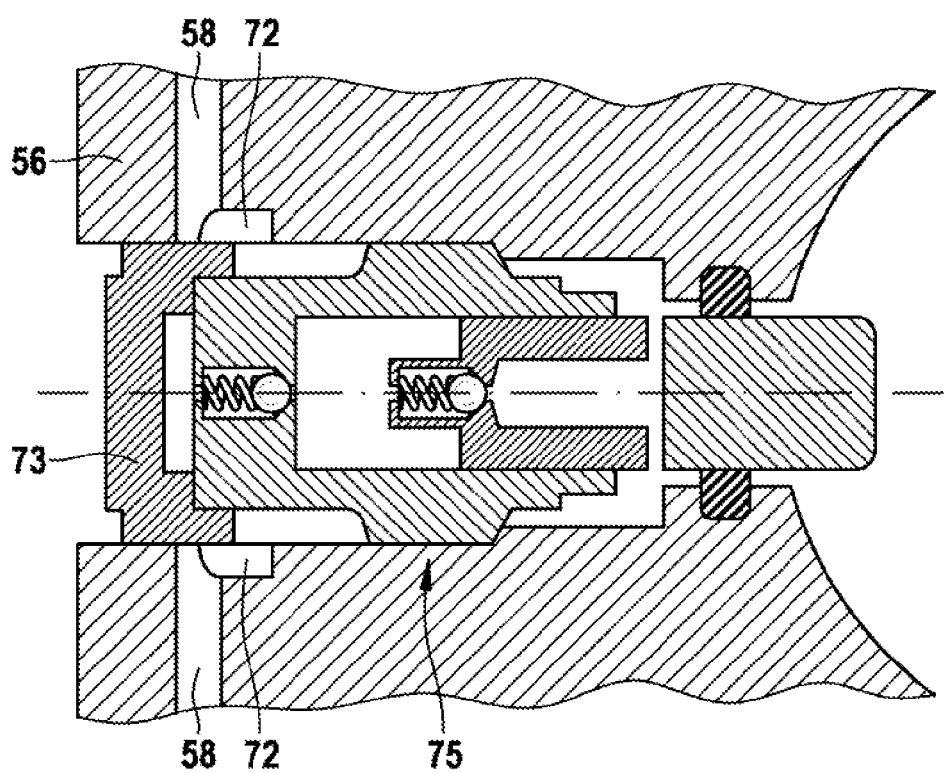
FIG. 5 shows the partial section V-V in FIG. 2.

At the intersection between the connecting lines 58 and and the pump element openings 28 and 30, the connecting lines 58 and 60 are routed tangentially through the pump element openings 28 and 30, which are cylindrical at this point, and are additionally provided in this area with undercuts 70 and 72 respectively. The undercuts 70 and 72 represent a fluid connection between the inner region of the pump element openings 28 and 30 and the connecting lines 58 and 60, which is located further out in the axial direction of the associated pump element openings 28 and 30 for reasons of space. This creates the possibility of flow around respective covers 73 of the associated pump elements 75 (see FIG. 5), said covers being inserted into the respective pump element openings 28 and 30. As an alternative, it is also possible for the covers 73 to be made larger in the radial direction and for the pump element openings 28 and 30 to be configured as stepped bores.

Like the rear face 16 of pump housing 10, the rear face 16 of pump housing 56 is provided with a total of eight valve openings 74, 76, 78, 80, 82, 84, 86 and 88, into which solenoid valves (not shown) for the selective closure and opening of the hydraulic connecting paths within the pump housings 10 and 56 are inserted.

The invention claimed is:

1. A pump housing of a motor vehicle hydraulic unit comprising:
   at least one side face;
   at least one main cylinder connection opening configured to connect to a main cylinder;
   at least one pump element opening configured to receive a pump element; and
   a connecting line which connects the at least one main cylinder connection opening to the at least one pump element opening,
   wherein the connecting line is configured as a pocket bore leading into the pump housing, and the pocket bore starts from the at least one side face, extends initially through the at least one pump element opening, and subsequently extends into the at least one main cylinder connection opening, and
   wherein the connecting line includes a first portion extending from the at least one side face to the at least one pump element opening and a second portion extending from the at least one pump element opening into the at least one main cylinder connection opening, and the first portion and the second portion are coaxial with respect to one another.

2. The pump housing as claimed in claim 1, wherein the pocket bore is configured as a stepped bore including at least one step, and a staked ball feature which closes the connecting line in a fluid tight manner, is formed at the at least one step.

3. The pump housing as claimed in claim 2, wherein:
   at least one accumulator opening is formed at the at least one side face,
   the connecting line defines a longitudinal direction, and
   the staked ball feature is formed between the at least one accumulator opening configured to receive an accumulator and the at least one pump element opening in the longitudinal direction of the connecting line.

4. The pump housing as claimed in claim 1, wherein:
   the at least one pump element opening is of circular cylindrical configuration,
   the connecting line is formed tangentially through the at least one pump element opening at an intersection, and
   the intersection between the connecting line and the at least one pump element opening is configured with an undercut in the at least one pump element opening.

5. The pump housing as claimed in claim 1, further comprising:
   a front face,
   wherein the at least one pump element opening is defined in a first side face of the at least one side face; and
   wherein the at least one main cylinder connection opening is defined in the front face.

6. A method for producing a pump housing of a motor vehicle hydraulic unit, comprising:
   forming at least one side face,
   forming at least one main cylinder connection opening configured to connect to a main cylinder,
   forming at least one pump element opening configured to receive a pump element, and
   forming a connecting line connecting the at least one main cylinder connection opening to the at least one pump element opening, wherein the connecting line is formed by boring from the at least one side face, through the at least one pump element opening, and into the at least one main cylinder connection opening.

7. The method as claimed in claim 6, wherein forming the connecting line further includes:
   forming a stepped bore including a step, and
   forming a staked ball feature, wherein the staked ball feature is configured to close the connecting line in a fluid tight manner and is formed at the step of the stepped bore.

8. The method as claimed in claim 7, further comprising:
   forming at least one accumulator opening at the at least one side face, wherein:
   forming the connecting line includes defining a longitudinal direction, and
   forming the staked ball feature includes forming the staked ball feature between the at least one accumulator opening, which is configured to receive an accumulator, and the at least one pump element opening in the longitudinal direction of the connecting line.

9. The method as claimed in claim 6, wherein:
forming the at least one pump element opening includes configuring the at least one pump element opening as a circular cylinder, and
forming the connecting line includes forming the connecting line tangentially through the at least one pump element opening at an intersection, and configuring the intersection with an undercut in the at least one pump element opening.

10. The method as claimed in claim 6, wherein forming the connecting line includes:
forming a first portion extending from the at least one side face to the at least one pump element opening; and
forming a second portion coaxial with respect to the first portion extending from the at least one pump element opening into the at least one main cylinder connection opening.

11. The method as claimed in claim 6, wherein:
forming the at least one pump element opening includes forming the at least one pump element opening in a first side face of the at least one side face; and
forming the at least one main cylinder connection opening includes forming the at least one main cylinder connection opening in a front face of the pump housing.

* * * * *